(12) United States Patent
Katoh

(10) Patent No.: US 11,558,520 B2
(45) Date of Patent: Jan. 17, 2023

(54) IMAGE READING DEVICE, IMAGE FORMING APPARATUS, IMAGE CORRECTION METHOD, AND NON-TRANSITORY RECORDING MEDIUM

(71) Applicant: Kenichi Katoh, Kanagawa (JP)

(72) Inventor: Kenichi Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/460,618

(22) Filed: Aug. 30, 2021

(65) Prior Publication Data
US 2022/0109768 A1 Apr. 7, 2022

(30) Foreign Application Priority Data
Oct. 7, 2020 (JP) .............................. JP2020-170108

(51) Int. Cl.
*H04N 1/00* (2006.01)
*H04N 1/387* (2006.01)

(52) U.S. Cl.
CPC ..... *H04N 1/00718* (2013.01); *H04N 1/00785* (2013.01); *H04N 1/3878* (2013.01); *H04N 2201/0081* (2013.01)

(58) Field of Classification Search
CPC ......... H04N 2201/0081; H04N 1/3878; H04N 1/00785; H04N 1/00718; H04N 5/148; H04N 5/16; H04N 5/66; H04N 5/68; H04N 5/70; G09G 3/3688; G09G 3/3677; G09G 3/3648; G09G 3/2011; G09G 2310/0283; G09G 3/3659; G09G 2300/0809; G09G 2310/0251; G09G 2310/0297; G09G 2330/021; G09G 2330/08; G09G 2300/0842; G09G 2330/023; G09G 3/3614; G09G 3/3666; G09G 2300/0408;
(Continued)

(56) References Cited

U.S. PATENT DOCUMENTS 6,912,325 B2 * 6/2005 Rombola ................ G06T 3/608
358/488
2010/0141991 A1 * 6/2010 Yoshida ............... H04N 1/3878
358/1.18
(Continued)

FOREIGN PATENT DOCUMENTS

JP 2010-166370 7/2010
JP 2015-082716 4/2015
JP 2018-157417 10/2018

*Primary Examiner* — Negussie Worku
(74) *Attorney, Agent, or Firm* — Harness, Dickey & Pierce, P.L.C.

(57) ABSTRACT

An image reading device includes a first reading device, a second reading device, and circuitry. The first reading device reads an image of one surface of a document. The second reading device reads an image of other surface of the document. The circuitry detects a first skew angle of skew in the read image of the one surface, performs skew correction on the image of the one surface based on the first skew angle, and forms a second skew angle for the image of the other surface. The second skew angle corresponds to reverse of the first skew angle. The circuitry further performs the skew correction on the image of the other surface based on the second skew angle, and outputs at least one of the image of the one surface subjected to the skew correction and the image of the other surface subjected to the skew correction.

20 Claims, 10 Drawing Sheets

(58) Field of Classification Search
CPC ..... G09G 2300/043; G09G 2300/0814; G09G 2310/0224; G09G 2310/0248; G09G 2310/027; G09G 2310/0286; G09G 2310/0289; G09G 2310/06; G09G 2310/066; G09G 2320/0223; G09G 2330/022; G09G 3/2074; G09G 3/3611; G09G 3/3655; G09G 3/3685; G02F 1/13452; G02F 1/13454; G02F 1/1362
USPC ......................................................... 358/474
See application file for complete search history.

(56) References Cited

U.S. PATENT DOCUMENTS

| | | | |
|---|---|---|---|
| 2010/0271646 A1* | 10/2010 | Morimoto | H04N 1/00681 358/1.9 |
| 2011/0075168 A1* | 3/2011 | Ikari | H04N 1/3878 358/1.9 |
| 2020/0296255 A1* | 9/2020 | Hashimoto | H04N 1/4097 |
| 2021/0014374 A1* | 1/2021 | Kawakubo | H04N 1/00777 |
| 2021/0160391 A1* | 5/2021 | Yamada | H04N 1/00777 |
| 2021/0368054 A1* | 11/2021 | Minami | H04N 1/00748 |
| 2021/0377395 A1* | 12/2021 | Hamada | H04N 1/3878 |
| 2022/0038593 A1* | 2/2022 | Nitta | G03G 15/60 |
| 2022/0070322 A1* | 3/2022 | Ogawa | H04N 1/3878 |
| 2022/0201155 A1* | 6/2022 | Nakajima | H04N 1/00737 |

* cited by examiner

IMAGE READING DEVICE, IMAGE FORMING APPARATUS, IMAGE CORRECTION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2020-170108, filed on Oct. 7, 2020 in the Japan Patent Office, the entire disclosure of which is hereby incorporated by reference herein.

BACKGROUND

Technical Field

The present invention relates to an image reading device, an image forming apparatus, an image correction method, and a non-transitory recording medium.

Description of the Related Art

There is an electric skew correction technique of correcting document skew and misregistration in the main scanning direction and the sub-scanning direction in image reading with an automatic document feeder (ADF) based on a skew angle and a registration position detected in an image read with the ADF.

In an image reading device that simultaneously reads two surfaces (i.e., a front surface and a rear surface) of a sheet automatically transported by the ADF, however, skew detection is separately performed on the front surface and the rear surface of the sheet in two-sided reading. Such an image reading device therefore includes a skew detection mechanism for each of the two surfaces (i.e., the front surface and the rear surface) of the sheet, complicating the structure of the image reading device.

SUMMARY

In one embodiment of this invention, there is provided an improved image reading device that includes, for example, a first reading device, a second reading device, and circuitry. The first reading device reads an image of one surface of a document. The second reading device reads an image of other surface of the document. The circuitry detects a first skew angle of skew in the read image of the one surface of the document, performs skew correction on the image of the one surface of the document based on the detected first skew angle of the skew in the image of the one surface of the document, and forms a second skew angle for the image of the other surface of the document. The second skew angle corresponds to reverse of the detected first skew angle of the skew in the image of the one surface of the document. The circuitry further performs the skew correction on the image of the other surface of the document based on the formed second skew angle for the image of the other surface of the document, and outputs at least one of the image of the one surface of the document subjected to the skew correction and the image of the other surface of the document subjected to the skew correction.

In one embodiment of this invention, there is provided an improved image forming apparatus that includes, for example, the above-described image reading device and an image forming device that forms an image output from the image reading device.

In one embodiment of this invention, there is provided an improved image correction method that includes, for example, controlling a first reading device to read an image of one surface of a document, controlling a second reading device to read an image of other surface of the document; detecting a first skew angle of skew in the read image of the one surface of the document; performing skew correction on the image of the one surface of the document based on the detected first skew angle of the skew in the image of the one surface of the document; and forming a second skew angle for the image of the other surface of the document. The second skew angle corresponds to reverse of the detected first skew angle of the skew in the image of the one surface of the document. The image correction method further includes performing the skew correction on the image of the other surface of the document based on the formed second skew angle for the image of the other surface of the document, and outputting at least one of the image of the one surface of the document subjected to the skew correction and the image of the other surface of the document subjected to the skew correction.

In one embodiment of this invention, there is provided a non-transitory recording medium storing a plurality of instructions which, when executed by one or more processors, cause the processors to perform the above-described image correction method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
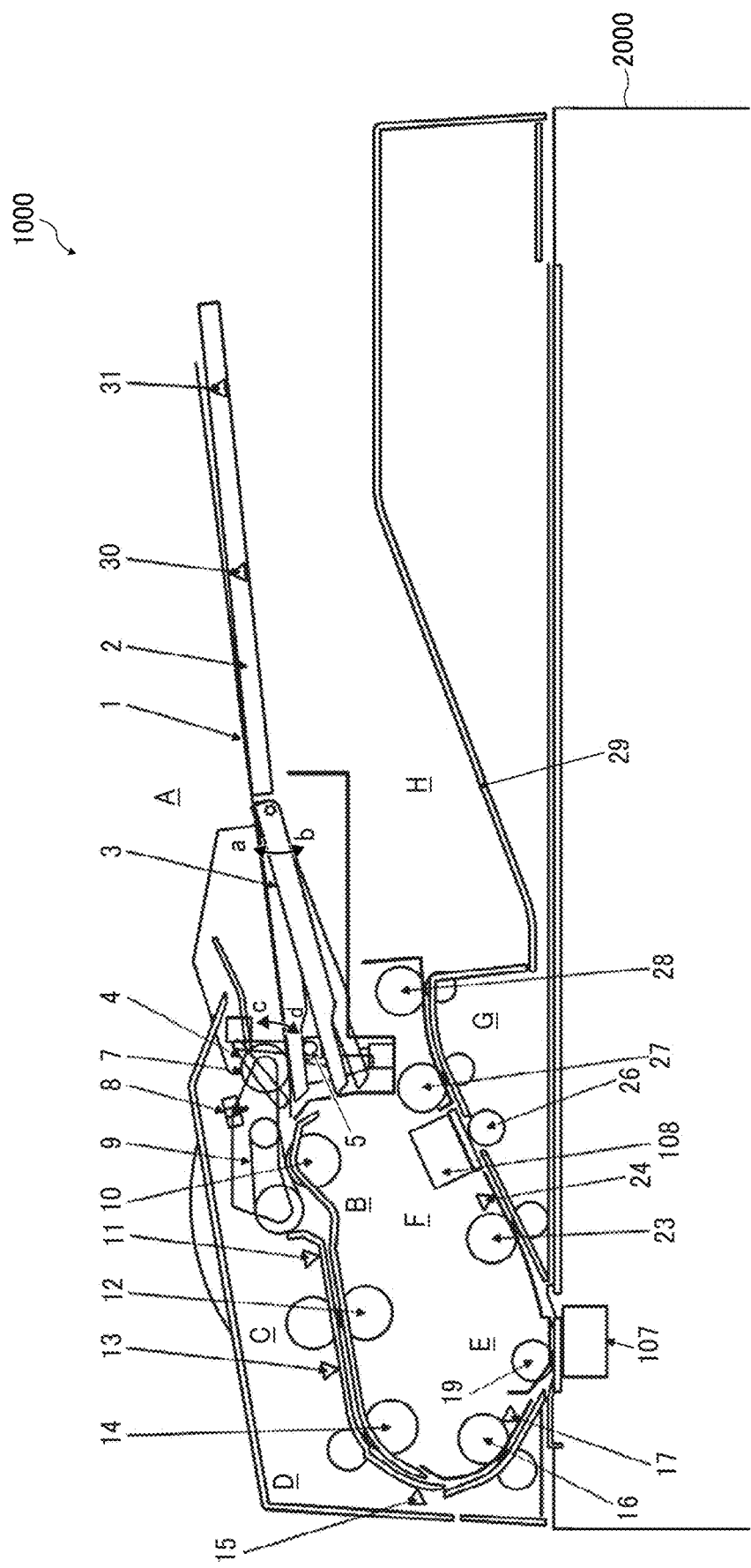
FIG. 1 is a cross-sectional view of major components of an image forming apparatus according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An image forming apparatus according to an embodiment of the present invention will be described below with reference to the accompanying drawings. An image reading device such as a scanner will be described here as an example of the image forming apparatus. The image forming apparatus, however, may be a multifunction peripheral (MFP) with at least two functions of a copier function, a scanner function, and a facsimile (FAX) function, for example. The present invention is applicable to any image forming apparatus with an image reading function, such as a copier, a scanner, or a FAX machine, for example.

Major components of an image reading device of the embodiment will be described.

FIG. 1 is a cross-sectional view of an image reading device 1000 of the embodiment. The image reading device 1000 of the embodiment includes contact image sensor (CIS) reading devices 107 and 108, each of which is a contact-type color image reading device. The CIS reading devices 107 and 108 enable simultaneous reading of two surfaces (i.e., a front surface and a rear surface) of a document. Together with an image forming device 2000 (hereinafter also referred to as the main device), the image reading device 1000 of the embodiment may form an image forming apparatus such as an MFP. The image forming device 2000 forms an image output from the image reading device 1000.

In FIG. 1, the image reading device 1000 includes a document setting section A, a separating and feeding section B, a registration section C, a turning section D, a first reading and transporting section E, a second reading and transporting section F, a sheet ejection section G, and a stacking section H.

A document stack 1 of documents to be read is set on the document setting section A. The separating and feeding section B separates a document from the other documents of the set document stack 1, and feeds the separated document to the registration section C. The registration section C has a function of causing the fed document to hit against pull-out rollers 12 to align the document and a function of pulling out and transporting the aligned document. The turning section D turns over the transported document and transports the turned document with an image surface (i.e., a surface with an image to be read) thereof facing down to face a front-surface CIS reading device 107.

The first reading and transporting section E reads the image of the front surface of the document from under a contact glass. The second reading and transporting section F reads the image of the rear surface of the document after the reading in the first reading and transporting section E. After the reading of the images of the front and rear surfaces of the document, the sheet ejection section G ejects the document to the outside of the image reading device 10X). The stacking section H holds a stack of read documents.

The document stack 1 of the documents to be read is set on a document table 2 including a movable document table 3, with the respective image surfaces of the documents facing up. The document stack 1 is further positioned with side guides so that the width direction of the document stack 1 is aligned perpendicular to a document transport direction. That the documents have been set is detected with a set filler 4 and a set sensor 5. The set sensor 5 then notify a controller of the main device that the documents have been set.

A surface of the document table 2 is equipped with document length sensors 30 and 31, each of which is a reflective sensor or an actuator-sensor that is capable of detecting a single document. With the document length sensor 30 or 31, an approximate length of the documents in the document transport direction is determined.

With a bottom plate lifting motor, the movable document table 3 is vertically movable in directions a and b in FIG. 1. When the documents set on the movable document table 3 are detected with the set filler 4 and the set sensor 5, the bottom plate lifting motor is driven forward to lift the movable document table 3 to bring the uppermost surface of the document stack 1 into contact with a pick-up roller 7.

The pick-up roller 7 is moved in directions c and d in FIG. 1 by a cam mechanism that is operated by a pick-up motor. As the movable document table 3 ascends, the uppermost surface of the document stack 1 on the movable document table 3 pushes and lifts the pick-up roller 7 in the direction c, and the maximum possible position of the document stack 1 is detected by an appropriate sheet feeding position sensor 8.

When a copy or scan instruction is issued based on an operation performed on an operation device of the main device by a user, a document feed signal is transmitted from the controller of the main device to a controller of the image reading device 1000. Thereby, a sheet feeding motor is rotated forward to drive the pick-up roller 7 to rotate and pick up one or more documents (ideally one document) from the document stack 1 on the document table 2. The rotation direction of the pick-up roller 7 corresponds to the direction of transporting the uppermost document of the document stack 1 to an entrance of a sheet feeding area.

With the forward rotation of the sheet feeding motor, a sheet feeding belt 9 is driven in a sheet feeding direction. Further, with the forward rotation of the sheet feeding motor, a reverse roller 10 is driven to rotate in the opposite direction to the sheet feeding direction to separate the uppermost document of the document stack 1 from the remaining documents placed thereunder and feed the uppermost document alone.

More specifically, the reverse roller 10 is in contact with the sheet feeding belt 9 with a predetermined pressure. When the reverse roller 10 is in direct contact with the sheet feeding belt 9 or in contact with the sheet feeding belt 9 via a single document, the reverse roller 10 is rotated counterclockwise by the rotation of the sheet feeding belt 9. The torque of the reverse roller 10 is set to be lower than the torque of a torque limiter when two or more documents enter the space between the sheet feeding belt 9 and the reverse roller 10. When two or more documents enter the space, therefore, the reverse roller 10 rotates clockwise in the original driving direction, thereby pushing back any excess document to prevent more than one documents from being transported at one time.

The document separated from the remaining documents by the operation of the sheet feeding belt 9 and the reverse roller 10 is further transported by the sheet feeding belt 9, and the leading end of the document is detected by a contact sensor 11. The document is then further transported and hits against the pull-out rollers 12 at rest. Then, the document is transported by a predetermined distance after the detection of the document by the contact sensor 11, and is pushed against the pull-out rollers 12 such that the document is bent to a predetermined degree. In this state, the sheet feeding motor is stopped to stop driving the sheet feeding belt 9.

In this process, the pick-up motor is rotated to retract the pick-up roller 7 from the upper surface of the document to transport the document by the transport force of the sheet feeding belt 9 alone. Thereby, the leading end of the document enters the nip between the upper and lower pull-out rollers 12 to be aligned (i.e., skew-corrected).

The pull-out rollers 12 thus have a skew correction function. The pull-out rollers 12 also function to transport the separated and skew-corrected document to intermediate rollers 14. The pull-out rollers 12 are driven by the reverse rotation of the sheet feeding motor.

During the reverse rotation of the sheet feeding motor, the pull-out rollers 12 and the intermediate rollers 14 are driven, but the pick-up roller 7 and the sheet feeding belt 9 are not driven. A plurality of document width sensors 13 are arranged in the depth direction of the image reading device 1000 to detect the width of the document transported by the pull-out rollers 12, i.e., the size of the document in the width direction perpendicular to the document transport direction.

The length of the document in the document transport direction is detected based on motor pulses generated in response to detection of the leading end and the trailing end of the document with the contact sensor 11. With the pull-out rollers 12 and the intermediate rollers 14 being driven, the document is transported from the registration section C to the turning section D. In this transport process, the document transport speed is set to be higher in the registration section C than in the first reading and transporting section E to reduce the processing time in sending the document to the first reading and transporting section E.

When the leading end of the document is detected by a reading device entrance sensor 15, the document transport speed starts to be reduced before the leading end of the document enters the nip between upper and lower reading device entrance rollers 16 to make the document transport speed equal to a reading and transport speed. At the same time, a reading motor is driven forward to drive the reading device entrance rollers 16, reading device exit rollers 23, and CIS exit rollers 27. When the leading end of the document is detected by a registration sensor 17, the document transport speed is reduced over a predetermined transport distance. The document is then temporarily stopped in front of the front-surface CIS reading device 107 (an example of a first reading device), and the registration sensor 17 transmits a registration stop signal to the controller of the main device.

Then, in response to receipt of a reading start signal from the controller of the main device, the document temporarily stopped for registration starts to be transported again, with the document transport speed being increased to reach a predetermined speed by the time when the leading end of the document arrives at a reading position. When the leading end of the document arrives at the front-surface CIS reading device 107, a gate signal is transmitted to the controller of the main device. The arrival of the leading end of the document at the front-surface CIS reading device 107 is detected based on the counting of pulses from the reading motor. The gate signal, which represents an effective image area in the sub-scanning direction of the front surface of the document, continues to be transmitted to the controller of the main device until the trailing end of the document passes the front-surface CIS reading device 107.

In one-sided document reading, the document passed through the first reading and transporting section E via a first reading roller 19 (i.e., a reference white member) is transported to the sheet ejection section G via a rear-surface CIS reading device 108 (an example of a second reading device). In this transport process, in response to detection of the leading end of the document by a sheet ejection sensor 24, a sheet ejection motor is driven forward to rotate sheet ejection rollers 28 counterclockwise. Further, based on the counting of pulses from the sheet ejection motor since the detection of the leading end of the document by the sheet ejection sensor 24, the driving speed of the sheet ejection motor is reduced immediately before the trailing end of the document passes the nip between the upper and lower sheet ejection rollers 28. Thereby, the document to be ejected onto a sheet ejection tray 29 is controlled not to jump out of the sheet ejection tray 29.

In two-sided document reading, when the leading end of the document arrives at the rear-surface CIS reading device 108, the gate signal representing the effective image area in the sub-scanning direction is transmitted to the rear-surface CIS reading device 108 from the controller of the image reading device 1000. The arrival of the leading end of the document at the rear-surface CIS reading device 108 is detected based on the counting of pulses from the reading motor since the detection of the leading end of the document by the sheet ejection sensor 24. The gate signal continues to be transmitted to the rear-surface CIS reading device 108 until the trailing end of the document passes the second reading and transporting section F. The document passed through the second reading and transporting section F via a second reading roller 26 (i.e., a reference white member) and the rear-surface CIS reading device 108 is transported to the sheet ejection section G.

A hardware configuration of major components of the image reading device 1000 of the embodiment will be described.

Figure 2:
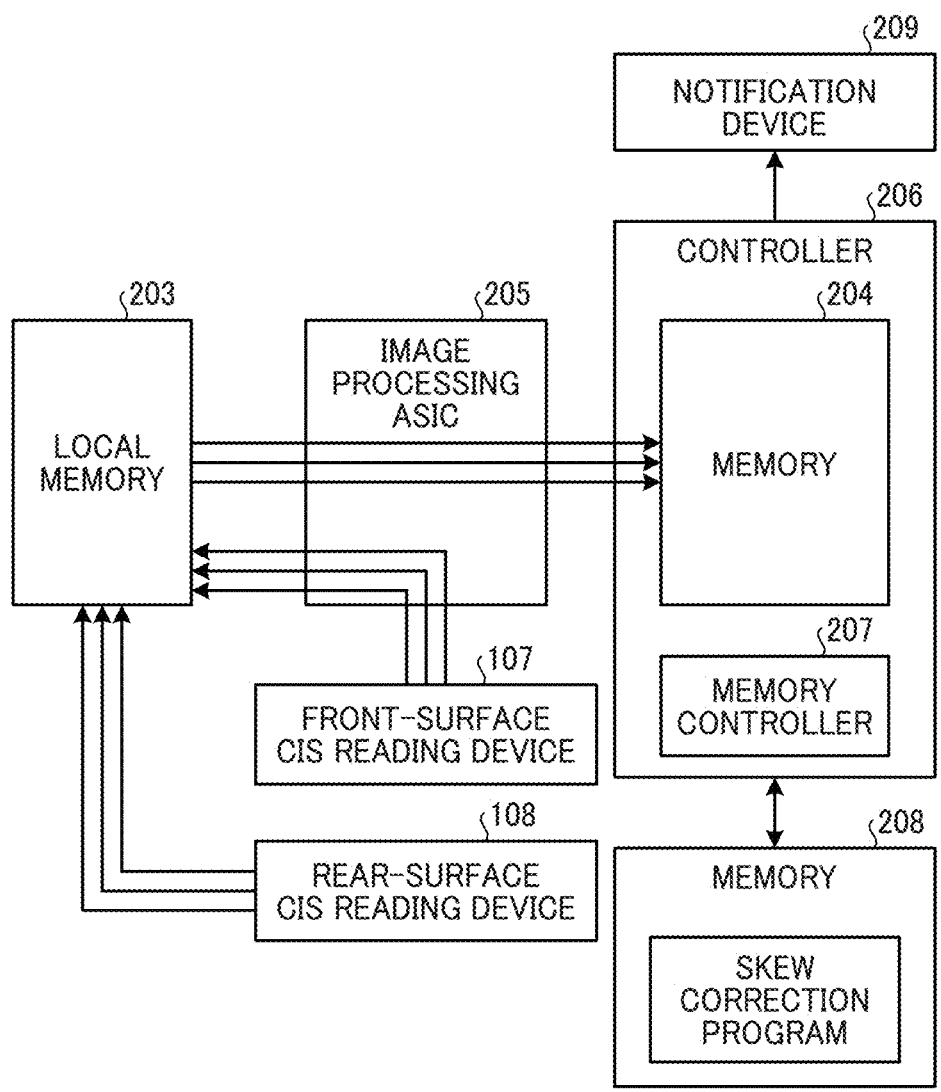
FIG. 2 is a block diagram illustrating a hardware configuration of major components of the image forming apparatus of the embodiment.

FIG. 2 is a block diagram illustrating a hardware configuration of major components of the image reading device 1000 of the embodiment. As illustrated in FIG. 2, the image reading device 1000 includes the front-surface CIS reading device 107, the rear-surface CIS reading device 108, a local memory 203, an image processing application specific integrated circuit (ASIC) 205, a controller 206, a memory 208, and a notification device 209.

The image reading device 1000 further includes an operation and display device. Via the operation and display device, the image reading device 1000 receives specifications from the user, such as the specification of the magnification of the image to be output and the specification of output conditions such as two-sided copy or one-sided copy, for example.

The image data of the document read by the front-surface CIS reading device 107 or the rear-surface CIS reading device 108 is temporarily stored in the local memory 203.

The image data read from the local memory 203 is stored in a memory 204 in the controller 206 via the image processing ASIC 205.

A memory controller 207 included in the controller 206 controls writing of the image data read by the front-surface CIS reading device 107 or the rear-surface CIS reading device 108 to the local memory 203. The memory controller 207 further controls reading of the image data written in the local memory 203. The memory controller 207 also controls writing and reading of various data to and from the memory 204.

In the image reading device 1000, the reading mode is set to one of two modes: serial mode and parallel mode. In the serial mode, after the image data of a document has been read from the local memory 203, the image data of the next document is written to the local memory 203. In the parallel mode, the reading of the image data of a document from the local memory 203 and the writing of the image data of the next document to the local memory 203 are executed in parallel. Information representing the set reading mode is stored in the memory 204. The reading mode is set by the user via the operation and display device.

In accordance with the set reading mode, the memory controller 207 controls the writing of the read image data to the local memory 203 and the reading of the image data stored in the local memory 203.

If the reading mode is set to the serial mode, and if the magnification of the output image is specified to be equal to or greater than a predetermined value, therefore, the memory controller 207 completes the reading of the image data of a document from the local memory 203 before the writing of the image data of the next document to the local memory 203.

More specifically, if the magnification of the output image specified in the one-sided document reading is equal to or greater than the predetermined value, the memory controller 207 completes the reading of the image data of the front surface of a document from the local memory 203 before the writing of the image data of the front surface of the next document to the local memory 203.

Further, if the magnification of the output image specified in the two-sided simultaneous document reading is equal to or greater than the predetermined value, the memory controller 207 completes the reading of the image data of the rear surface (i.e., a second surface) of a document from the local memory 203 before the writing of the image data of the front surface (i.e., a first surface) of the next document to the local memory 203.

If the magnification of the output image is not specified, the reading of the image data of a document and the writing of the image data of the next document are sequentially executed.

The memory 208 stores a skew correction program (an example of an image forming program). The controller 206 controls the skew correction of the read image based on the skew correction program. If it is difficult to perform the skew correction on the read image, the controller 206 performs error notification via the notification device 209. The error notification will be described in detail later.

A functional configuration of the image reading device 1000 will be described.

Figure 3:
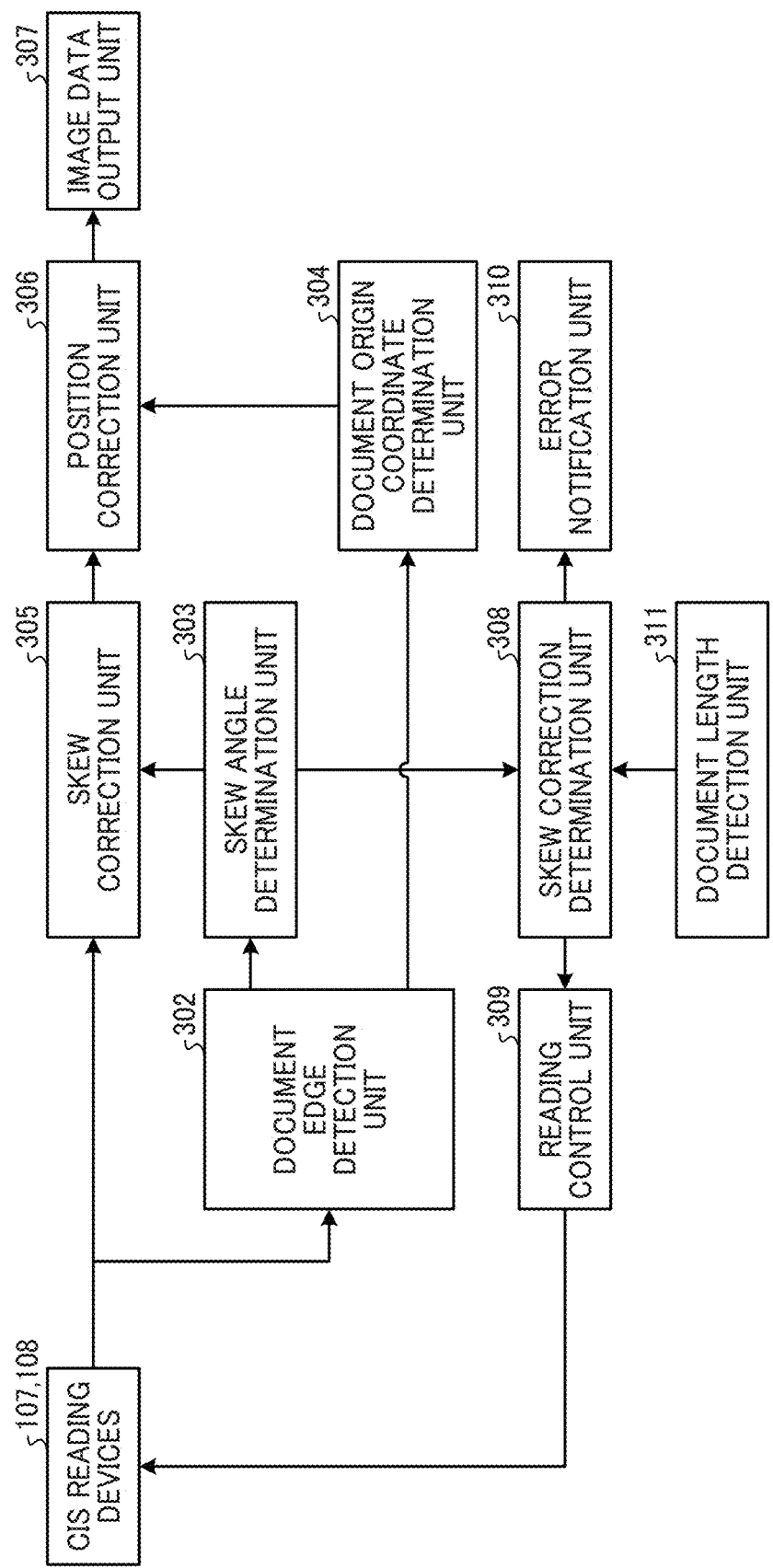
FIG. 3 is a block diagram illustrating functions of the image forming apparatus of the embodiment.

FIG. 3 is a block diagram illustrating functions of the image reading device 1000, which are implemented when the controller 206 operates based on the skew correction program. The controller 206 operates based on the skew correction program to function as a document edge detection unit 302, a skew angle determination unit 303, a document origin coordinate determination unit 304, a skew correction unit 305, a position correction unit 306, an image data output unit 307, a skew correction determination unit 308, a reading control unit 309, an error notification unit 310, and a document length detection unit 311, as illustrated in FIG. 3.

In the image reading device 1000 of the embodiment, the skew correction process for two reading devices, i.e., the front-surface CIS reading device 107 (an example of the first reading device) and the rear-surface CIS reading device 108 (an example of the second reading device), is performed by a skew correction function for one system (i.e., the document edge detection unit 302 to the document length detection unit 311). In FIG. 3, the front-surface CIS reading device 107 and the rear-surface CIS reading device 108 are collectively illustrated as the CIS reading devices 107 and 108.

The document edge detection unit 302 detects edges of a document area based on image information obtained from the front-surface CIS reading device 107 and the rear-surface CIS reading device 108. The skew angle determination unit 303 determines the skew angle of the document area with detection information of the edges of the document area in the read image detected by the document edge detection unit 302.

The skew correction unit 305 performs the skew correction on the image of the front surface of the document based on the determined skew angle. The skew correction unit 305 further generates the skew angle for the image of the rear surface of the document, which corresponds to the reverse of the skew angle used in the skew correction on the image of the front surface of the document. Then, the skew correction unit 305 performs the skew correction on the image of the rear surface of the document with the skew angle generated for the image of the rear surface of the document. Consequently, the skew correction is performed on both the image of the front surface and the image of the rear surface with the skew correction function for one system (i.e., the skew correction function for the image of the front surface of the document).

The position correction unit 306 performs position correction by translation with the coordinate information of the position of the origin of the document area determined by the document origin coordinate determination unit 304 and the information of the skew correction. The image data output unit 307 outputs image data for subsequent processing based on the information of the position correction.

The skew correction determination unit 308 determines whether the skew in the image information is greater than a predetermined threshold value and thus difficult to correct. The reading control unit 309 controls the reading of the front-surface CIS reading device 107 and the rear-surface CIS reading device 108. When the skew correction determination unit 308 determines that the image information has skew greater than the predetermined threshold value and thus difficult to correct, the error notification unit 310 performs error notification via the notification device 209 to allow the user to choose between continuing the image output and rereading the document.

The document length detection unit 311 determines whether the length of the document in the sub-scanning direction is less than a predetermined value. It is difficult to perform the skew correction when the length of the document in the sub-scanning direction is less than the predetermined value. In this case, therefore, the skew detection is forcibly terminated.

The units illustrated in FIG. 3, i.e., the document edge detection unit 302 to the document length detection unit 311, are implemented by software with the skew correction program, as described above. Alternatively, all or part of these units may be implemented by hardware such as an integrated circuit (IC).

The skew correction program may be provided as recorded on a computer readable recording medium, such as a compact disc (CD)-ROM or a flexible disk (FD), as file information in an installable or executable format. Further, the skew correction program may be provided as recorded on a computer readable recording medium, such as a CD-recordable (CD-R), a digital versatile disc (DVD), a Blu-ray Disc (registered trademark), or a semiconductor memory. Further, the skew correction program may be provided as installed in the image reading device 1000 via a network such as the Internet, or may be provided as preinstalled in a memory of the image reading device 1000 such as a ROM.

An image reading operation of the image reading device 1000 will be described.

Each of the front-surface CIS reading device 107 and the rear-surface CIS reading device 108 generates and outputs 8-bit digital image data for each of the three primary colors of red (R), green (G), and blue (B) based on shading information of the document obtained through scanning the front surface or the rear surface of the document.

Figure 4A:
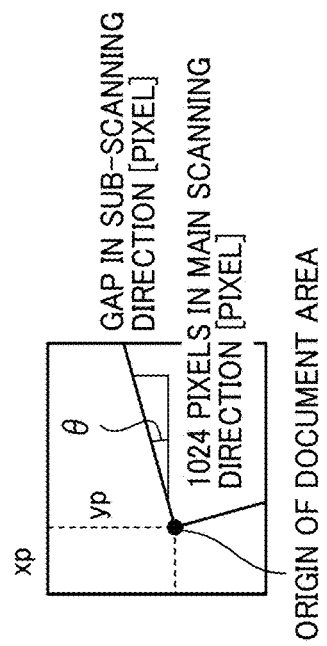
FIGS. 4A, 4B, and 4C are diagrams illustrating a skew detecting operation of the embodiment to detect skew in a read image.
Figure 4B:
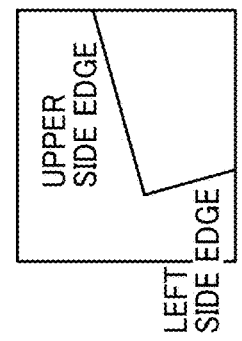

For example, in the digital image data of the input image in FIG. 4A input from each of the front-surface CIS reading device 107 and the rear-surface CIS reading device 108, the document edge detection unit 302 detects the edges of the document area in a whole image including the document area and a background area (i.e., the information of the read image). The document edge detection unit 302 therefore binarizes the information of the read image with a first threshold value for determination, to thereby detect a boundary between the background area and a shade area near outline edges of the document area in the read image. The document edge detection unit 302 further detects the width of the shade area, and adds the width of the shade area to the boundary between the shade area and the background area. Thereby, the edges of the document area in the read image are detected (i.e., extracted), as illustrated in the edge extraction result of FIG. 4B.

The skew angle determination unit 303 determines the skew angle of the document area with the detection information of the edges of the document area in the read image detected by the document edge detection unit 302. The skew angle may be determined by a method of calculating the angle of a straight line approximating the detection information of the edges of the document area in the read image detected by the document edge detection unit 302. The skew angle may be determined by a method other than the above-described one. Specifically, the skew angle determination unit 303 outputs skew angle information representing a slope (gap) in the sub-scanning direction of the document relative to 1024 pixels in the main scanning direction of the document, for example (e.g., an angle θ in FIG. 4C). When the slope is right side up, the slope has a positive value. When the slope is right side down, the slope has a negative value.

Figure 4C:
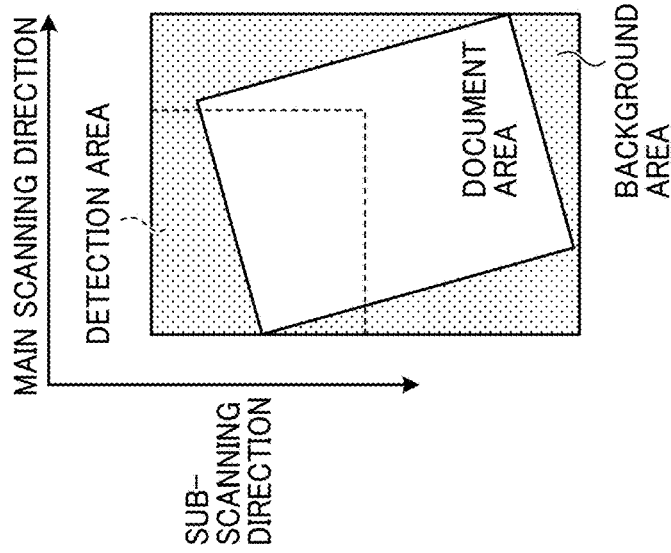

The document origin coordinate determination unit 304 determines the position of the origin of the document area with the detection information of the edges of the document area in the read image detected by the document edge detection unit 302, as illustrated in the skew detection result of FIG. 4C. The position of the origin of the document area may be determined by a method using the intersection of a vertical side and the straight line approximating the detection information of the edges of the document area in the read image detected by the document edge detection unit 302. The method of determining the position of the origin of the document area, however, is not limited to a particular method. Specifically, the document origin coordinate determination unit 304 calculates the intersection of an upper edge and a left edge of the document area, and determines the coordinates of the calculated intersection as the coordinates of the origin of the document area. The document origin coordinate determination unit 304 then outputs a value xp in the main scanning direction and a value yp in the sub-scanning direction as the coordinates of the origin of the document area.

The skew correction unit 305 performs the skew correction on the read image by rotating the read image with the information of the skew angle determined by the skew angle determination unit 303. The position correction unit 306 performs the position correction by translation with the coordinate information of the position of the origin of the document area determined by the document origin coordinate determination unit 304 and the information of the skew correction. The image data output unit 307 outputs the image data for subsequent processing based on the information of the position correction.

The image reading operation of the image reading device 1000 will be described in more detail.

In the image reading device 1000 of the embodiment, the skew correction determination unit 308 in FIG. 3 determines whether the skew correction is executable for the skew angle of the document area determined by the skew angle determination unit 303. If it is determined that the skew correction is difficult to perform for the skew angle of the document area determined by the skew angle determination unit 303, the error notification unit 310 notifies the user of an error via the notification device 209 illustrated in FIG. 2. Notified of the error, the user selects between outputting the image of the document without correcting the skew and rereading the document. Thereby, unnecessary printout operations are reduced.

Figure 5:
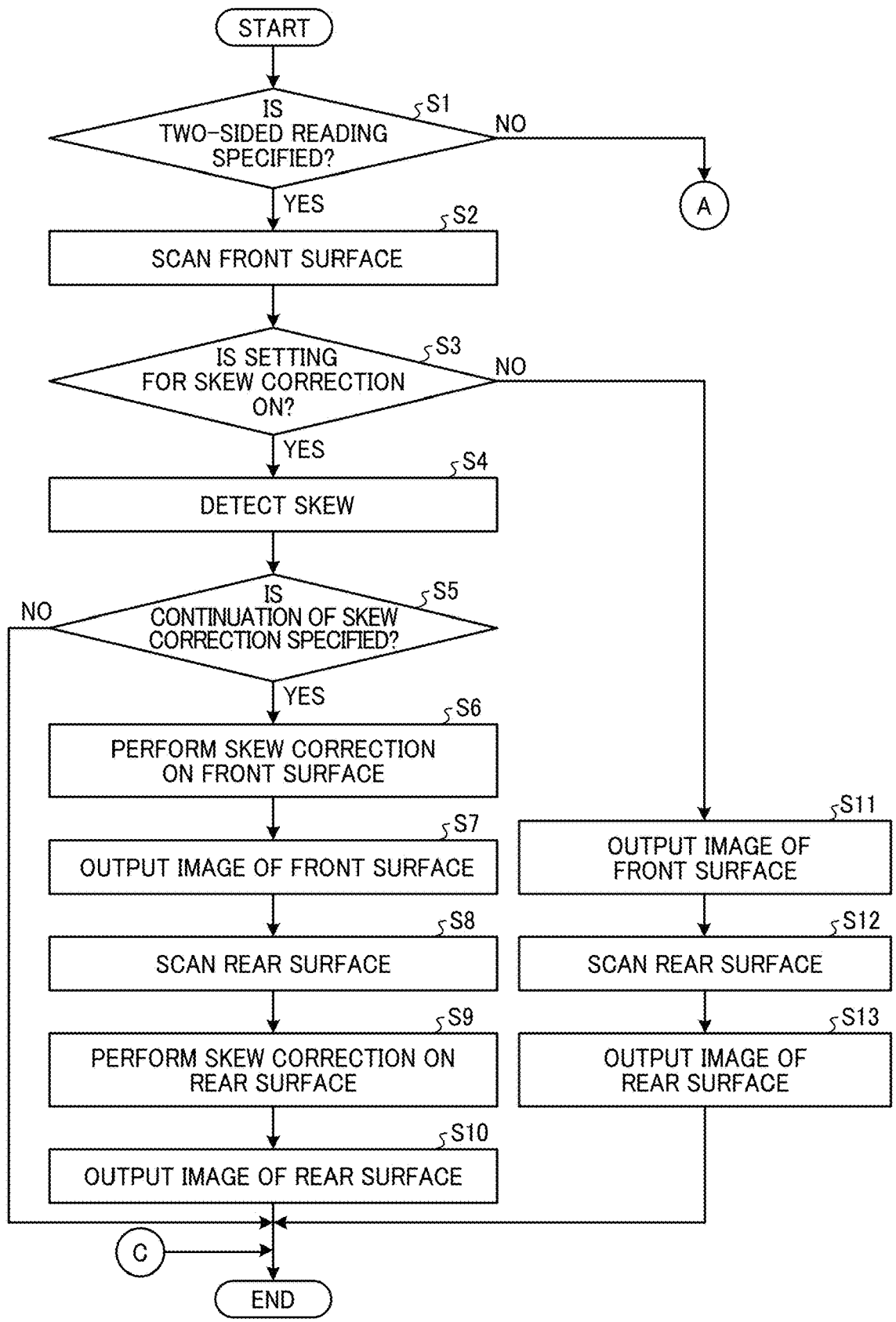
FIG. 5 is a flowchart illustrating a procedure of a two-sided reading operation performed in the image forming apparatus of the embodiment.
Figure 6:
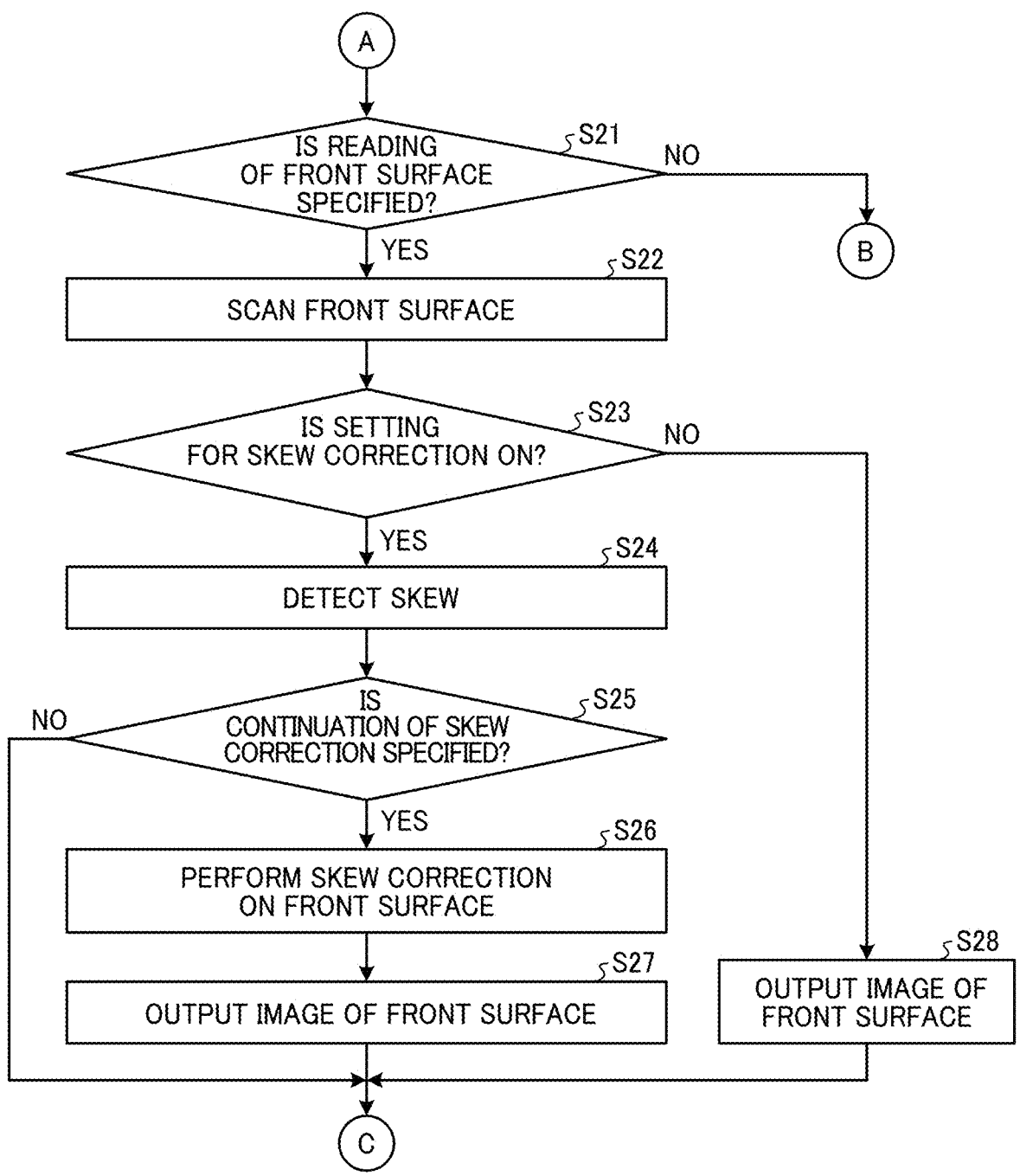
FIG. 6 is a flowchart illustrating a procedure of a front surface reading operation performed in the image forming apparatus of the embodiment.
Figure 7:
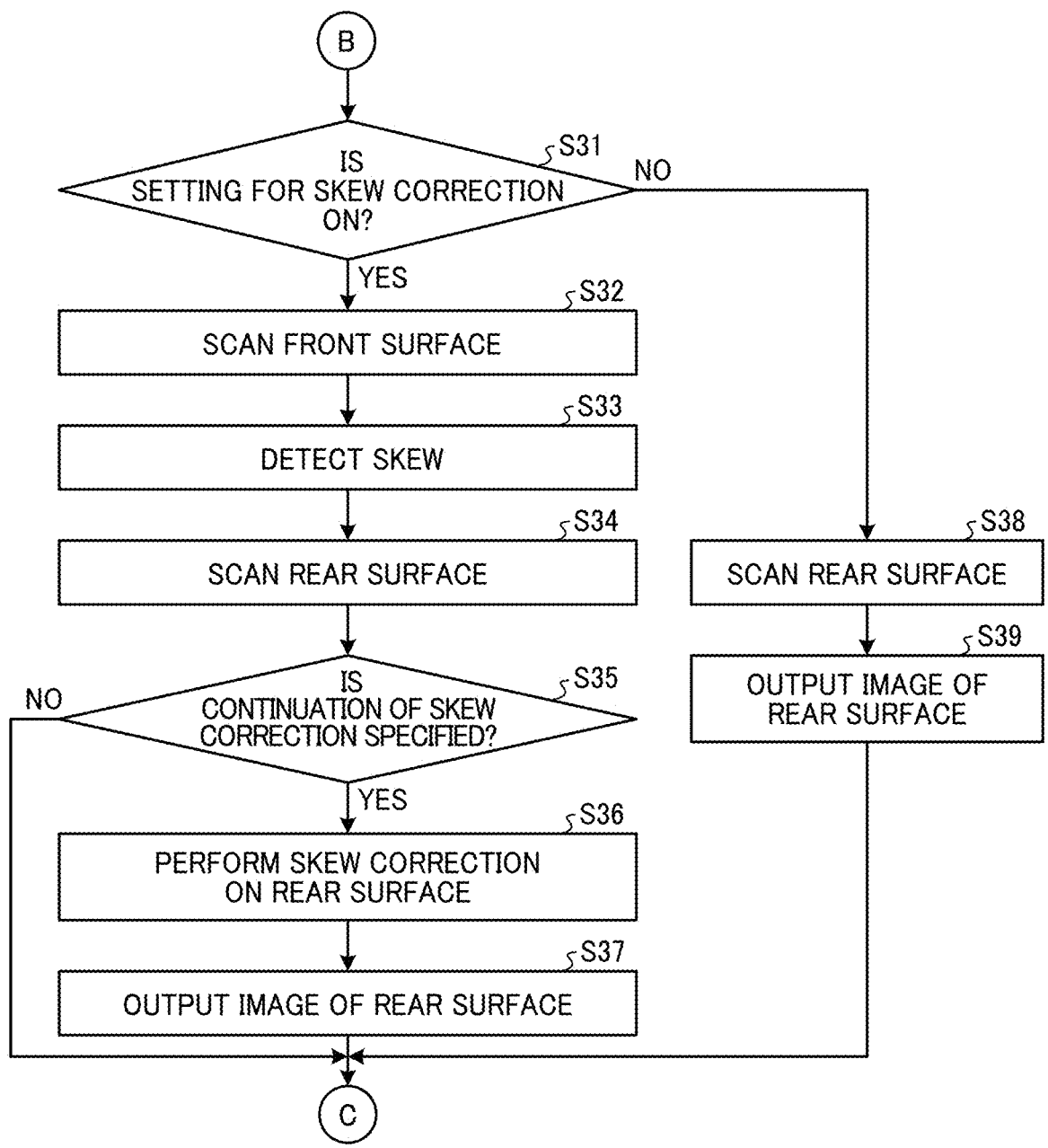
FIG. 7 is a flowchart illustrating a procedure of a rear surface reading operation performed in the image forming apparatus of the embodiment.

FIGS. 5 to 7 are flowcharts each illustrating a detailed procedure of the image reading operation performed in the image reading device 1000 of the embodiment described above. FIG. 5 is a flowchart illustrating a procedure of the two-sided reading operation performed in the image reading device 1000 of the embodiment. FIG. 6 is a flowchart illustrating a procedure of a front surface reading operation performed in the image reading device 1000 of the embodiment. FIG. 7 is a flowchart illustrating a procedure of a rear surface reading operation performed in the image reading device 1000 of the embodiment.

The two-sided document reading operation performed in the image reading device 1000 of the embodiment will first be described with the flowchart of FIG. 5.

When the user specifies the two-sided document reading, the reading control unit 309 in FIG. 3 recognizes the user specification of the two-sided document reading (YES at step S1), and controls the reading of the front-surface CIS reading device 107 to scan the front surface of the document (step S2).

Then, the skew correction unit 305 determines whether the setting for executing the skew correction is selected by the user, i.e., whether the setting for the skew correction is on (step S3). If it is determined that the setting for the skew correction is turned off by the user (NO at step S3), the image data output unit 307 outputs the image of the front surface of the document read at step S2 and not subjected to the skew correction (step S11).

After the image of the front surface of the document is output, the reading control unit 309 controls the reading of the rear-surface CIS reading device 108 to scan the rear surface of the document (step S12). The image data output unit 307 then outputs the image of the rear surface of the document read at step S12 and not subjected to the skew correction (step S13). Thereby, the two-sided document reading operation in the flowchart of FIG. 5 is completed.

If it is determined that the setting for the skew correction is turned on by the user (YES at step S3), the skew of the document is detected with the document edge detection unit 302, the skew angle determination unit 303, and the skew correction unit 305, as described above with FIGS. 4A to 4C (step S4). Then, the procedure proceeds to the process of step S5.

The process of step S5 corresponds to a subroutine process described later with the flowchart of FIG. 8 or 9. As described later with the flowchart of FIG. 8 or 9, if the skew detected at step S4 is large skew difficult to correct, the error notification unit 310 in FIG. 3 notifies the user of an error via the notification device 209 in FIG. 2. Notified of the error, the user determines whether to continue the skew correction, and specifies the continuation or cancellation of the skew correction.

At step S5, the skew correction unit 305 determines whether the continuation of the skew correction is specified by the user. If it is determined that the continuation of the skew correction is specified by the user despite the skew difficult to correct (YES at step S5), the skew correction unit 305 performs the skew correction process on the image of the front surface of the document read at step S2 (step S6). Then, the image data output unit 307 outputs the skew-corrected image of the front surface of the document (step S7).

In this case, the image of the front surface has the skew difficult to correct. Even with the skew correction performed at step S6, therefore, the output image of the front surface still has a certain degree of skew. The image with such skew is still useful, however, if the user desires the immediate acquisition of the image or considers it sufficient as long as the contents of the image are legible or recognizable, for example.

If it is determined that the cancellation of the skew correction is specified by the user because of the skew difficult to correct (NO at step S5), the skew correction determination unit 308 controls the image data output unit 307 to cancel the output of the image. Thereby, unnecessary image output is prevented. In this case, the user may perform a document rereading operation.

After the image of the front surface of the document is thus output, the reading control unit 309 controls the reading of the rear-surface CIS reading device 108 to scan the rear surface of the document (step S8). In the image reading device 1000 of the embodiment, the skew correction is performed on the image of the rear surface of the document based on the skew angle detected from the image of the front surface of the document.

If it is determined at step S5 that the continuation of the skew correction is specified by the user, therefore, the skew correction unit 305 performs the skew correction on the image of the rear surface of the document based on the skew angle detected from the image of the front surface of the document (step S9). That is, the skew correction unit 305 generates a skew angle corresponding to the reverse of the skew angle of the image of the front surface of the document. Therefore, if the skew angle of the image of the front surface has a positive value, for example, the skew angle for the image of the rear surface has a negative value. The skew correction unit 305 generates the above-described skew angle for the image of the rear surface, and performs the skew correction on the image of the rear surface with the generated skew angle. Then, the image data output unit 307 outputs the skew-corrected image of the rear surface (step S10).

As described above, the skew angle is detected from the scanned image of one surface of the document, and the skew correction is performed on the one surface of the document with the detected skew angle. Further, the skew angle for the other surface of the document is generated from the scanned image of the one surface of the document, and the skew correction is performed on the other surface of the document with the generated skew angle. It is therefore unnecessary to provide two skew correction systems: one for the one surface of the document and one for the other surface of the document. That is, the skew correction system for the one surface of the document alone is capable of performing the skew correction on both the one surface and the other surface of the document. Consequently, the image reading device 1000 of the embodiment is simplified in configuration and reduced in manufacturing cost.

The front surface reading operation of the image reading device 1000 of the embodiment will be described.

When the user specifies the reading of the front surface of the document, the reading control unit 309 in FIG. 3 recognizes the user specification of the reading of the front surface of the document via step S1 in the flowchart of FIG. 5 (NO at step S1 in FIG. 5 and YES at step S21 in FIG. 6). In this case, the reading control unit 309 controls the reading of the front-surface CIS reading device 107 to scan the front surface of the document (step S22).

Then, the skew correction unit 305 determines whether the setting for the skew correction is selected by the user, i.e., whether the setting for the skew correction is on (step S23). If it is determined that the setting for the skew correction is turned off by the user (NO at step S23), the image data output unit 307 outputs the image of the front surface of the document read at step S22 and not subjected to the skew correction (step S28). Thereby, the front surface reading operation in the flowchart of FIG. 6 is completed.

If it is determined that the setting for the skew correction is turned on by the user (YES at step S23), the skew of the front surface of the document is detected with the document edge detection unit 302, the skew angle determination unit 303, and the skew correction unit 305, as described above with FIGS. 4A to 4C (step S24). Then, the procedure proceeds to the process of step S25.

In the process of step S25, if the skew detected at step S24 is large skew difficult to correct, the error notification unit 310 in FIG. 3 notifies the user of an error via the notification device 209 in FIG. 2, as described later with the flowchart of FIG. 8 or 9. Notified of the error, the user determines whether to continue the skew correction, and specifies the continuation or cancellation of the skew correction.

At step S25, the skew correction unit 305 determines whether the continuation of the skew correction is specified by the user. If it is determined that the continuation of the skew correction is specified by the user despite the skew difficult to correct (YES at step S25), the skew correction unit 305 performs the skew correction process on the image of the front surface of the document read at step S22 (step S26). Then, the image data output unit 307 outputs the skew-corrected image of the front surface of the document (step S27).

In this case, the image of the front surface has the skew difficult to correct. Even with the skew correction performed at step S26, therefore, the output image of the front surface still has a certain degree of skew. The image with such skew is still useful, however, if the user desires the immediate acquisition of the image or considers it sufficient as long as the contents of the image are legible or recognizable, for example.

If it is determined that the cancellation of the skew correction is specified by the user because of the skew difficult to correct (NO at step S25), the skew correction determination unit 308 controls the image data output unit 307 to cancel the output of the image. Thereby, unnecessary image output is prevented. In this case, the user may perform the document rereading operation.

The rear surface reading operation of the image reading device 1000 of the embodiment will be described.

When the user specifies the reading of the rear surface of the document, the reading control unit 309 in FIG. 3 recognizes the user specification of the reading of the rear surface of the document via step S1 in the flowchart of FIG. 5 and step S21 in the flowchart of FIG. 6 (NO at step S1 in FIG. 5 and NO at step S21 in FIG. 6). In this case, the skew correction unit 305 first determines whether the setting for the skew correction is selected by the user, i.e., whether the setting for the skew correction is on (step S31), as illustrated in FIG. 7.

If it is determined that the setting for the skew correction is turned off by the user (NO at step S31), the reading control unit 309 controls the rear-surface CIS reading device 108 to scan the rear surface of the document (step S38). Then, the image data output unit 307 outputs the image of the rear surface of the document read at step S38 and not subjected to the skew correction (step S39). Thereby, the rear surface reading operation in the flowchart of FIG. 7 is completed.

If it is determined that the setting for the skew correction is turned on by the user (YES at step S31), the reading control unit 309 controls the front-surface CIS reading device 107 to scan the front surface of the document (step S32). That is, in the image reading device 1000 of the embodiment, the skew correction is performed on the image of the rear surface of the document based on the skew angle detected from the image of the front surface of the document, as described above. Even if the reading of the image of the rear surface is specified, therefore, the image of the front surface is first read.

Then, the skew of the front surface of the document is detected with the document edge detection unit 302, the skew angle determination unit 303, and the skew correction unit 305, as described above with FIGS. 4A to 4C (step S33). Then, the procedure proceeds to the process of step S34.

At step S34, the reading control unit 309 controls the rear-surface CIS reading device 108 to scan the rear surface of the document.

Then, if the skew detected at step S33 is large skew difficult to correct, the error notification unit 310 in FIG. 3 notifies the user of an error via the notification device 209 in FIG. 2, as described later with the flowchart of FIG. 8 or 9 (step S35). Notified of the error, the user determines whether to continue the skew correction, and specifies the continuation or cancellation of the skew correction.

At step S35, the skew correction unit 305 determines whether the continuation of the skew correction is specified by the user. If it is determined that the continuation of the skew correction is specified by the user despite the skew difficult to correct (YES at step S35), the skew correction unit 305 performs the skew correction process on the image of the rear surface of the document read at step S34 with the skew angle detected from the image of the front surface of the document read at step S32 (step S36). Then, the image data output unit 307 outputs the skew-corrected image of the rear surface of the document (step S37).

In this case, the image of the front surface has the skew difficult to correct. Even with the skew correction performed on the image of the rear surface at step S36, therefore, the output image of the rear surface still has a certain degree of skew. The image with such skew is still useful, however, if the user desires the immediate acquisition of the image or considers it sufficient as long as the contents of the image are legible or recognizable, for example.

If it is determined that the cancellation of the skew correction is specified by the user because of the skew difficult to correct (NO at step S35), the skew correction determination unit 308 controls the image data output unit 307 to cancel the output of the image. Thereby, unnecessary image output is prevented. In this case, the user may perform the document rereading operation.

The error notification operation due to the skew difficult to correct will be described. The error notification operation performed at step S5 in FIG. 5, step S25 in FIG. 6, or step S35 in FIG. 7 owing to the skew difficult to correct will be described with the flowchart of FIG. 8.

Figure 8:
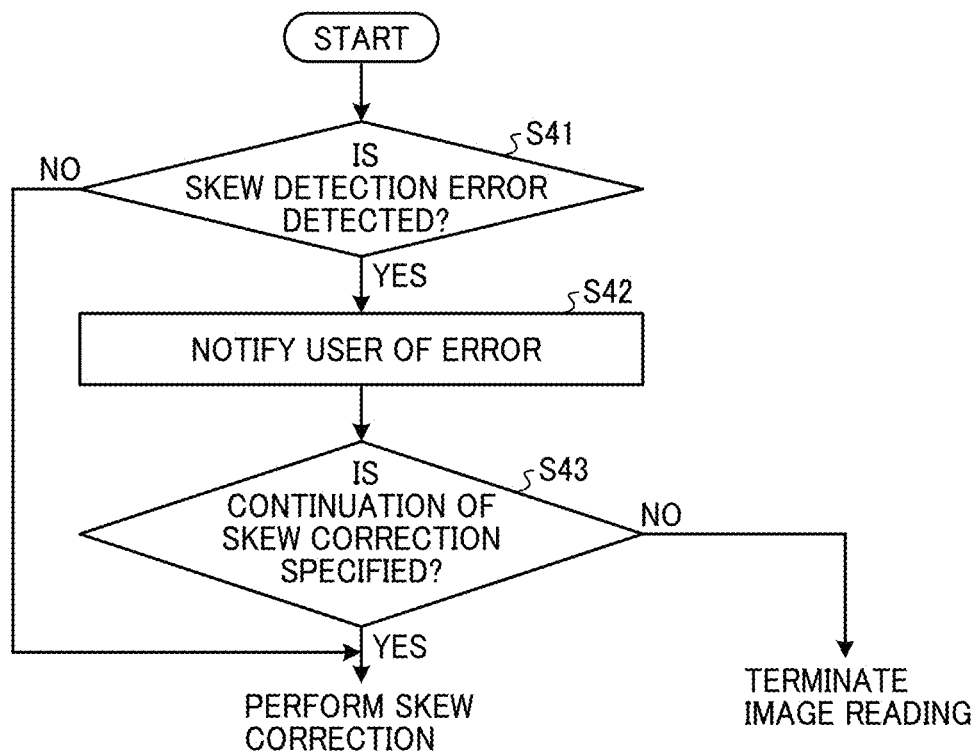
FIG. 8 is a flowchart illustrating a procedure of an operation performed in the image forming apparatus of the embodiment when detected skew is too large to correct.

If skew is detected in the image of the front surface of the document at step S4 in FIG. 5, step S24 in FIG. 6, or step S33 in FIG. 7, the procedure proceeds to step S41 in the flowchart of FIG. 8.

At step S41, if the skew angle detected at step S4 in FIG. 5, step S24 in FIG. 6, or step S33 in FIG. 7 exceeds a threshold value such as 15 or 20 degrees, for example, the skew correction determination unit 308 in FIG. 3 determines that the scanned image of the front surface of the document has skew difficult to correct, i.e., detects a skew detection error (YES at step S41).

When such skew difficult to correct is detected, the error notification unit 310 notifies the user of the occurrence of the skew difficult to correct (i.e., performs the error notification) via the notification device 209 in FIG. 2 (step S42). The notification device 209 may be implemented by a display or speaker, for example. The notification may be delivered as a certain error message displayed on the display or a voice message or electronic sound output via the speaker to indicate the occurrence of the error, for example.

In response to such error notification, the user determines whether to continue the skew correction, and specifies the continuation or cancellation of the skew correction.

At step S43, the skew correction unit 305 determines whether the continuation of the skew correction is specified by the user. If it is determined that the continuation of the skew correction is specified by the user despite the skew difficult to correct (YES at step S43), the skew correction unit 305 performs the skew correction process on the scanned image of the front surface and/or the rear surface of the document, as described above. Then, the image data output unit 307 outputs the skew-corrected image of the front surface and/or the rear surface of the document.

In this case, the image of the front surface has the skew difficult to correct. Even with the skew correction performed at step S6, S9, S26, or S36, therefore, the output image of the front surface and/or the rear surface still has a certain degree of skew. The image with such skew is still useful, however, if the user desires the immediate acquisition of the image or considers it sufficient as long as the contents of the image are legible or recognizable, for example.

If it is determined that the cancellation of the skew correction is specified by the user because of the skew difficult to correct (NO at step S43), the skew correction determination unit 308 controls the image data output unit 307 to cancel the output of the image of the front surface of the document read at step S2 or S22 or the image of the rear surface of the document read at step S34. Thereby, unnecessary image output is prevented. In this case, the user may perform the document rereading operation.

As a modified example of the operation performed in response to the skew detection, an operation of forcibly terminating the skew detection will be described with the flowchart of FIG. 9.

Figure 10:
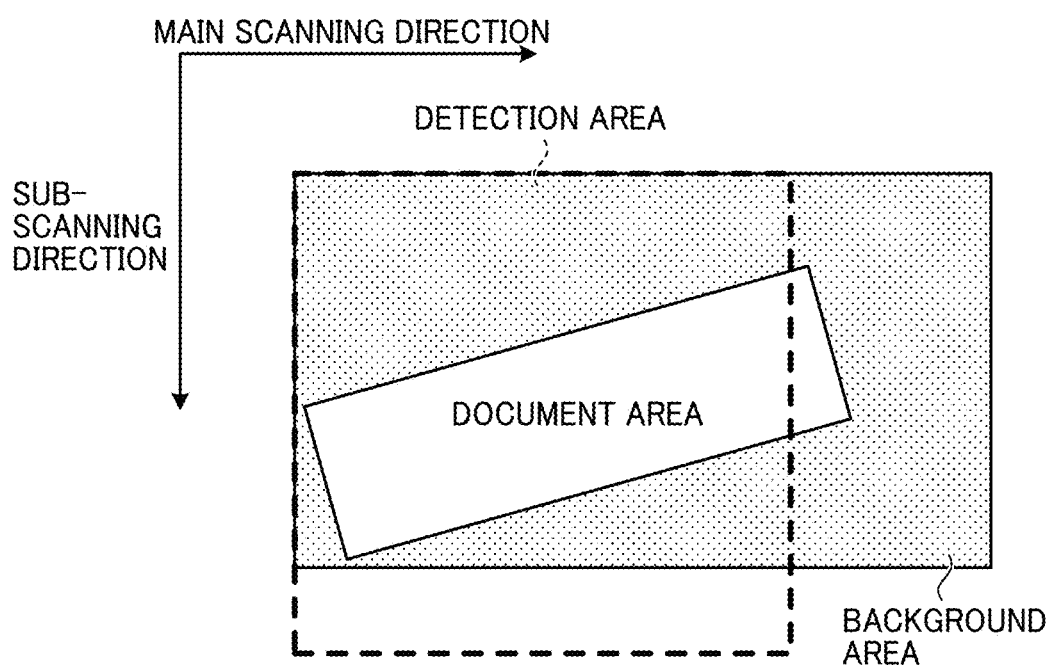
FIG. 10 is a diagram illustrating an example in which a skew detection operation is forcibly terminated in the image forming apparatus of the embodiment.

To detect the skew, the document should have a certain minimum length, as illustrated in the area enclosed by a broken line in the input image illustrated in FIG. 10. That is, the image data corresponding to the area enclosed by the broken line in FIG. 10 is used to detect the skew. If the data volume of the image data obtained by scanning is less than that of the image data corresponding to the area enclosed by the broken line, it is difficult to execute the skew correction.

Figure 9:
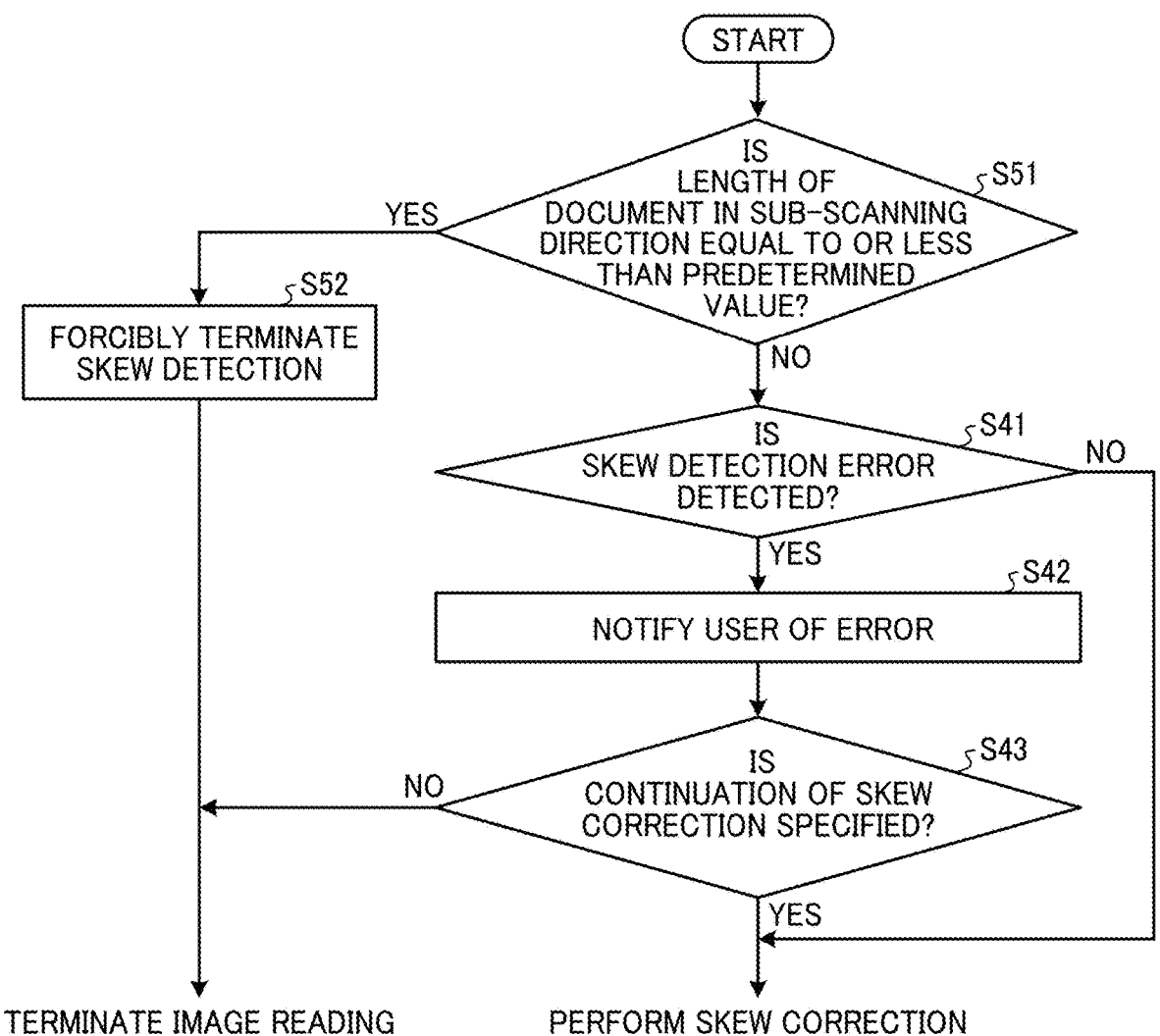
FIG. 9 is a flowchart illustrating a skew detection forced termination operation performed in the image forming apparatus of the embodiment.

When the procedure proceeds from step S4 in FIG. 5, step S24 in FIG. 6, or step S33 in FIG. 7 to step S51 in FIG. 9, therefore, the document length detection unit 311 in FIG. 3 determines, upon passage of the trailing end of the document through a reading line, whether the length of the document in the sub-scanning direction is equal to or less than a predetermined value. If it is determined that the length of the document in the sub-scanning direction is equal to or less than the predetermined value (YES at step S51), it is difficult to execute the skew correction. The skew correction determination unit 308 therefore controls the document edge detection unit 302, the skew angle determination unit 303, and the skew correction unit 305 to forcibly terminate the skew correction (step S52). In this case, the image data output unit 307 outputs the image not subjected to the skew correction.

If it is determined that the length of the document in the sub-scanning direction is greater than the predetermined value (NO at step S51), the skew correction is executable. In this case, the skew correction unit 305 may perform the skew correction based on the detected skew angle. Alternatively, the error notification may be performed in accordance with the degree of the detected skew, as described above, to leave the decision of whether to continue the skew correction to the user (steps S41 to S43).

As understood from the foregoing description, the image reading device 1000 of the embodiment detects the skew angle from the scanned image of one surface of the document, and performs the skew correction on the one surface of the document with the detected skew angle. The image reading device 1000 further generates the skew angle for the skew correction on the other surface of the document, which corresponds to the reverse of the skew angle used in the skew correction on the one surface of the document. Then, the image reading device 1000 performs the skew correction on the other surface of the document with the skew angle generated for the other surface of the document.

Accordingly, it is unnecessary to provide two skew correction systems: one for the one surface of the document and one for the other surface of the document. That is, the skew correction system for the one surface of the document alone is capable of performing the skew correction on both the one surface and the other surface of the document; it suffices if the image reading device 1000 includes the single skew correction system for the one surface of the document.

Consequently, the image reading device 1000 of the embodiment is simplified in configuration and reduced in manufacturing cost.

Further, the image reading device 1000 of the embodiment performs the error notification when the document has large skew difficult to correct. Then, if the continuation of the skew correction is selected by the user, the image reading device 1000 performs the maximum possible skew correction on the image and outputs the thus skew-corrected image. If the cancellation of the skew correction is selected by the user, on the other hand, the image reading device 1000 stops the output of the read image. In this case, the user may perform the document rereading operation to obtain an image with no skew.

Further, if the length of the document in the sub-scanning direction is less than a sufficient length for executing the skew correction (i.e., the skew detection), the image reading device 1000 of the embodiment forcibly terminates the skew detection, and outputs the image without executing the skew correction. Thereby, the time for the skew detection is omitted, contributing to a reduction in time spent to output the image of the document.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image reading device comprising:
a first reading device configured to read a first image of first surface of a document;
a second reading device configured to read a second image of a second surface of the document; and
circuitry configured to
detect a first skew angle of skew in the first image,
perform skew correction on the first image based on the first skew angle,
form a second skew angle for the second image, the second skew angle corresponding to a reverse of the first skew angle,
perform the skew correction on the second image based on the second skew angle, and
output at least one of the first image subjected to the skew correction the second image subjected to the skew correction.

2. The image reading device of claim 1, wherein the circuitry is further configured to
perform an error notification in response to the first skew angle exceeding a threshold value,
receive a response to the error notification,
perform the skew correction on at least one of the first image or the second image, in response to the response to the error notification indicating to continue the skew correction, and cancel the output of the at least one of the first image or the second image, in response to the response to the error notification indicating to cancel the skew correction.

3. The image reading device of claim 2, wherein the circuitry is further configured to
determine whether the document has a sufficient length for executing skew detection, and
terminate the skew detection in response to determining that the document has an insufficient length for executing the skew detection.

4. An image forming apparatus comprising:
the image reading device of claim 1; and
an image forming device configured to form an image output from the image reading device.

5. The image reading device of claim 1, wherein the first surface is a front side of the document and the second surface is a rear side of the document.

6. The image reading device of claim 1, wherein the first reading device and the second reading device are contact image sensor reading devices.

7. The image reading device of claim 1, wherein the circuitry is configured to detect the first skew angle by detecting edges of the document in the first image and calculating an angle of a straight line approximating the edges.

8. The image reading device of claim 1, wherein the first image corresponds with a digital scan of a front of the document and the second image corresponds with a digital scan of a rear of the document.

9. The image reading device of claim 1, wherein the first reading device is configured to read the first image of the first surface of a document and the second reading device is configured to read the second image of the second surface of the document simultaneously.

10. An image correction method comprising:
controlling a first reading device to read a first image of a first surface of a document;
controlling a second reading device to read a second image of a second surface of the document;
detecting a first skew angle of skew in the first image;
performing skew correction on the first image based on the first skew angle;
forming a second skew angle for the second image, the second skew angle corresponding to a reverse of the first skew angle;
performing the skew correction on the second image based on the second skew angle; and
outputting at least one of the first image subjected to the skew correction or the second image subjected to the skew correction.

11. The image correction method of claim 10, wherein the first surface is a front side of the document and the second surface is a rear side of the document.

12. The image correction method of claim 10, wherein the first reading device and the second reading device are contact image sensor reading devices.

13. The image correction method of claim 10, wherein the detecting the first skew angle includes detecting edges of the document in the first image and calculating an angle of a straight line approximating the edges.

14. The image correction method of claim 10, wherein the first image corresponds with a digital scan of a front of the document and the second image corresponds with a digital scan of a rear of the document.

15. The image correction method of claim 10, wherein the controlling the first reading device to read the first image and the controlling the second reading device to read the second image are performed simultaneously.

16. A non-transitory recording medium storing a plurality of instructions which, when executed by one or more processors, cause the processors to perform an image correction method comprising:
controlling a first reading device to read a first image of a first surface of a document;
controlling a second reading device to read a second image of a second surface of the document;
detecting a first skew angle of skew in the first image;
performing skew correction on the first image based on the first skew angle;
forming a second skew angle for the second image, the second skew angle corresponding to a reverse of the first skew angle;
performing the skew correction on the second image based on the second skew angle; and
outputting at least one of the first image subjected to the skew correction or the second image subjected to the skew correction.

17. The non-transitory recording medium of claim 16, wherein the first surface is a front side of the document and the second surface is a rear side of the document.

18. The non-transitory recording medium of claim 16, wherein the first reading device and the second reading device are contact image sensor reading devices.

19. The non-transitory recording medium of claim 16, wherein the detecting the first skew angle includes detecting edges of the document in the first image and calculating an angle of a straight line approximating the edges.

20. The non-transitory recording medium of claim 16, wherein the first image corresponds with a digital scan of a front of the document and the second image corresponds with a digital scan of a rear of the document.

* * * * *